(12) United States Patent
Hanson

(10) Patent No.: US 10,941,705 B2
(45) Date of Patent: Mar. 9, 2021

(54) HANSON-HABER AIRCRAFT ENGINE FOR THE PRODUCTION OF STRATOSPHERIC COMPOUNDS AND FOR THE CREATION OF ATMOSPHERIC REFLECTIVITY AND ABSORPTION AND TO INCREASE GROUND REFLECTIVITY OF SOLAR RADIATION IN THE 555NM RANGE AND TO INCREASE JET ENGINE THRUST AND FUEL ECONOMY THROUGH THE COMBUSTION OF AMMONIA AND AMMONIA BY-PRODUCTS

(71) Applicant: Matthew Vernon Hanson, Cambridge, MA (US)

(72) Inventor: Matthew Vernon Hanson, Cambridge, MA (US)

( * ) Notice: Subject to any disclaimer, the term of this patent is extended or adjusted under 35 U.S.C. 154(b) by 15 days.

(21) Appl. No.: 16/510,924

(22) Filed: Jul. 14, 2019

(65) Prior Publication Data
US 2021/0010419 A1  Jan. 14, 2021

(51) Int. Cl.
*F02C 3/30* (2006.01)
*C01C 1/04* (2006.01)
(Continued)

(52) U.S. Cl.
CPC ............... *F02C 3/30* (2013.01); *B64D 37/30* (2013.01); *C01C 1/0405* (2013.01); *F02C 6/20* (2013.01); *F23R 3/36* (2013.01); *Y02E 60/36* (2013.01)

(58) Field of Classification Search
CPC . F02C 3/30; F02C 6/20; C01C 1/0405; B64D 37/30; F23R 3/36
See application file for complete search history.

(56) References Cited

U.S. PATENT DOCUMENTS

| 4,416,224 A | * | 11/1983 | Hobby | F02M 25/12 123/3 |
| 4,750,453 A | * | 6/1988 | Valdespino | F02B 43/10 123/3 |

(Continued)

OTHER PUBLICATIONS

"2-Methylhexane." Wikipedia, Wikimedia Foundation, Aug. 29, 2017, en.wikipedia.org/wiki/2-Methylhexane.

(Continued)

*Primary Examiner* — Michael C Zarroli

(57) ABSTRACT

Modifying existing commercial jet engine technology to leverage the temperature and pressure available in the combustion of kerosene A-1 jet fuel (or other fuels) to include the Haber process (or other industrial processes requiring high temperatures and high pressures) presents possibilities for the creation of ammonia and other down-stream compounds suitable for atmospheric seeding of reflective or absorptive compounds. Compounds such as ammonia and urea (or other compounds—as time goes on) provide alternatives to high-altitude (20 km) seeding of sulfur dioxide (which is destructive to atmosphere, vegetation, and ozone alike). Additionally, the changes required to existing engine technology analogous to adding a catalytic converter to the exhaust system of a car, provide, through the leveraging of the strong chemical bond of atmospheric nitrogen (N2), additional overall energy output to the engine system (through heat) and the production of a potentially combustible liquid or gas (ammonia and down-stream ammonia compounds or other compounds) which could be used as a downstream fuel source by the engine itself.

1 Claim, 15 Drawing Sheets

Ideal Combustion:
$$CO_2 + H_2O + N_2 + O_2 + SO_2$$

Actual Combustion:
$$CO_2 + H_2O + N_2 + O_2 + NO_x + UHC + CO + C_{SOOT} + SO_x$$

Hanson-Haber Additions:  $NH_3 + CH_4N_2O + NO + N_2O + THRUST$

(51) Int. Cl.
  *B64D 37/30* (2006.01)
  *F02C 6/20* (2006.01)
  *F23R 3/36* (2006.01)

(56) References Cited

U.S. PATENT DOCUMENTS

2012/0321528 A1* 12/2012 Peters .................. C01B 32/50
  422/187
2016/0006066 A1* 1/2016 Robertson ............ C25B 15/08
  429/418
2019/0189882 A1* 6/2019 Hiller ................... H01L 35/30

OTHER PUBLICATIONS

"Aviation Fuel." Wikipedia, Wikimedia Foundation, Jan. 16, 2019, en.wikipedia.org/wiki/Aviation_fuel.
Cain, Patrick. "Empty Skies after 9/11 Set the Stage for an Unlikely Climate Change Experiment." Global News, Global News, Sep. 16, 2016, globalnews.ca/news/2934513/empty-skies-after-911-set-the-stage-for-an-unlikely-climate-change-experiment/experiment/.
"Combustor." Wikipedia, Wikimedia Foundation, Aug. 16, 2018, en.wikipedia.org/wiki/Combustor.
"First Flight of Rolls-Royce Trent XWB-97 Aero Engine; Highest Thrust, 3D-Printed Structure." Green Car Congress, Nov. 9, 2015, www.greencarcongress.com/2015/11/20151109-trentxwb,html.
"Flow Diagram of Urea Production Process from Ammonia and Carbon-Dioxide." Engineers Guide, enggyd.blogspot.com/2010/09/flow-diagram-of-urea-production-process.html.
"Haber Process," Wikipedia Wikimedia Foundation, Dec. 16, 2018, en.wikipedia.org/wiki/Haber_process.
Hofstrand, Don "Ammonia as a Transportation Fuel." Agricultural Marketing Resource Center, AgMRC Renewable Energy Newsletter, May 2009, www.agmrc.org/renewable-energy/renewable-energy/ammonia-as-a-transportation-fuel.
"Inversion Spectrum of Ammonia." Inversion Spectrum of Ammonia, University of Washington, courses. washington.edu/phys432/NH3/ammonia_inversion.pdf, Information on geometry of ammonia molecule, and inversion spectra.
Isla, Miguel A and Horacio Irazoqui. "Simulation of a Urea Synthesis Reactor 1: Thermodynamic Framework." EurekaMag: Life, Earth, and Health Sciences, eurekamag.com/pdf/002/002492359.pdf. Background on dessication in Urea process.
"Jet Fuels JP-4 and JP-7; Section 3: Chemical and Physical Information." CDC ATSDR: Agency for Toxic Substances and Disease Registry, Center for Desase Control and Prevention, www.atsdr.cdc.gov/ToxProfiles/tp76-c3.pdf, Background information.
Knuth, Don. "Jet Engines: A Historical Introduction: How the Jet Engine Works." Don Knuth's Home Page, Stanford University, Mar. 16, 2004, cs.stanford.edu/people/eroberts/courses/ww2/projects/jet-airplanes/planes.html, Section on "Bang".
Mahalingam, Murugan. "Microwave Reflectivity Measurement of Silicon Urea Polyvinyl Alcohol / Epoxy Resin Composites in X and Ku Bands." Resarch Gate, Dec. 2009, www.researchgate.net/profile/Murugan_Mahalingam/publication/251920681_Microwave_reflectivity_measurement_of_silicon_urea_polyvinly_alcohol_epoxy_resin_composites_in_X_and_Ku_bands/links/56150a2908aec62244117b52/Microwave-reflectivity-measurement-of-silicon-urea-polyvinyl-alcohol-epoxy-resin-composites-in-X-and-Ku-bands.pdf.
Messer, A'Ndrea Elyse. "Jet Contrails Affect Surface Temperatures." Penn State News, Penn State University, Jun. 18, 2015, news.psu.edu/story/361041/2015/06/18/research/jet-contrails-affect-surface-temperatures.
"Nitrous Oxide," Wikipedia Wikimedia Foundation, Jan. 15, 2019, en.wikipedia.org/wiki/Nitrous_oxide.
Notman, Nina. "Haber-Bosch Power Consumption Slashed." Chemistry World, Oct. 21, 2012, www.chemistryworld.com/news/haber-bosch-power-consumption-slashed/5544.article.
Schifman, Jonathan. "The Entire History of Steel." Popular Mechanics, Popular Mechanics, Dec. 20, 2018, www.popularmechanics.com/technology/infrastructure/a20722505/history-of-steel/.
Smith, Wake and Germot Wagner, "Stratospheric Aerosol Injection Tactics and Costs in the First 15 Years of Deployment." Environmental Research Letters, vol. 13, No. 12, Nov. 22, 2018, p. 124001.
Stubbings, Janice. Uses and Production of Ammonia by the Haber Process. www.ausetute.com.au/haberpro.html.
Travis, David J, et. al. "Contrails Reduce Daily Temperature Range." Archive.org, Nature, Aug. 8, 2002, web.archive.org/web/20160411094048/http://www.atmos.washington.edu/~rennert/etc/courses/pcc587/ref/Travis-etal2002_Nature.pdf. Nature vol. 418.
"Urea Production and Manufacturing Process." ICIS, Apr. 28, 2010, www.icis.com/explore/resources/news/2007/11/07/9076560/urea-production-and-manufacturing-process/.
Valera-Medina, Agustin et. al. "Ammonia—Methane Combustion in Tangential Swirl Burners for Gas Turbine Power Generation." Elsevier/Applied Energy, Academic Press, Feb. 24, 2016, www.sciencedirect.com/science/article/pii/S0306261916302100#f0010. Primarily section 3.
Woodford, Chris. "Jet Engines." Explain That Stuff, Apr. 22, 2018, www.explainthatstuff.com/jetengine.html. Primarily section titled "Types of Jet Engines".

* cited by examiner

Area for Hanson-Haber process addition to jet engine

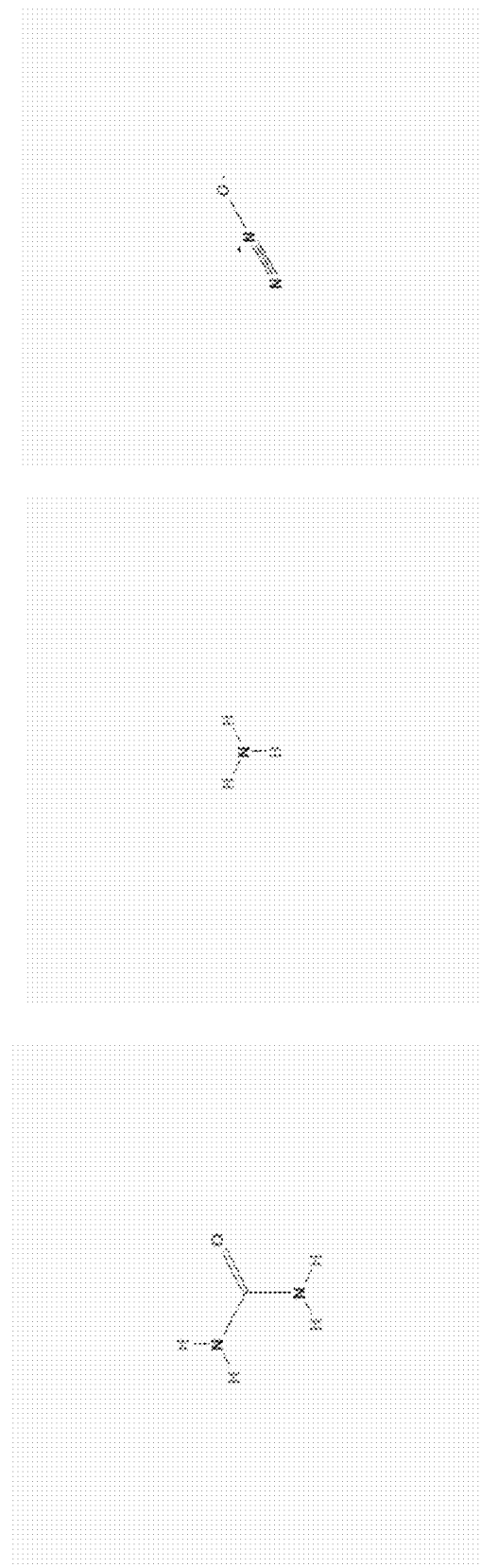

HANSON-HABER AIRCRAFT ENGINE FOR THE PRODUCTION OF STRATOSPHERIC COMPOUNDS AND FOR THE CREATION OF ATMOSPHERIC REFLECTIVITY AND ABSORPTION AND TO INCREASE GROUND REFLECTIVITY OF SOLAR RADIATION IN THE 555NM RANGE AND TO INCREASE JET ENGINE THRUST AND FUEL ECONOMY THROUGH THE COMBUSTION OF AMMONIA AND AMMONIA BY-PRODUCTS

BACKGROUND OF THE INVENTION

The present invention focuses on engine modifications to commercial turbofan engines utilizing Jet-A or Jet-A1 fuel and utilizing the temperatures and pressures inside the engine itself to trigger the Haber Process or other processes for the purpose of producing ammonia and liquid and crystalline urea (or other reflective or absorptive compounds) for the purpose of slowing global warming.

Additionally, the production of ammonia adjacent to the high temperatures in the combustion chamber of a jet engine creates opportunities to combust ammonia for additional thrust.[1]

Additionally, the by-product of various ammonia catalyzation processes (for example, nitrous oxide) can produce additional thrust or more efficient thrust in a secondary, adjacent, or follow-on combustion chamber.

Ammonia, urea, and the Haber Process are used below as an example. However, the temperatures and pressures available in the modern jet engine utilizing certain types of fuels provides the possibility of forcing chemical reactions requiring high pressures and temperatures downstream from, or in conjunction with, the engine itself.

The invention does not seek to protect any current jet engine technology, nor any existing or prior patents related to the Haber Process: rather the invention is the process of modifying jet engines to include the Haber Process or other industrial processes for the purpose of creating down-stream chemical compounds which might have a variety of uses.

BRIEF DESCRIPTION OF SEVERAL VIEWS OF THE DRAWINGS

FIG. 15 is the chemical structure of urea, ammonia, and Nitrous Oxide.

DETAILED DESCRIPTION OF THE INVENTION

Modifying existing commercial jet engine technology to leverage the temperature and pressure available in the combustion of kerosene A-1 jet fuel (Jet A) to include the Haber Process (or other industrial processes requiring high temperatures and high pressures) presents possibilities for the creation of ammonia and other down-stream compounds suitable for atmospheric seeding of reflective or absorptive compounds to reduce global temperatures—as well as creating fuel economy through the production of additional thrust.

Compounds such as ammonia (to start) and urea (or other compounds) provide alternatives to Smith and Wegner's[7] proposal of high-altitude (20 km) seeding of sulfur dioxide (which is destructive to the structure of the atmosphere and ozone alike). The $SO_2$ compounds required in Wegner's study at high atmosphere are problematic however as they eventually, as particulates, will fall and create sulfuric acid, sulfurous acid, and sulfuric particulates, and may well end up doing more damage than good. This outcome is not desirable.

Additionally, the relatively small changes required to existing engine technology analogous to adding a catalytic converter to the exhaust system of a car, provide, through the leveraging of the strong chemical bond of atmospheric nitrogen ($N_2$), the possibility of additional overall energy output to various jet engine systems.

Additionally, the tetrahedral structure of ammonia (and/or urea), provides a significant energy sink inherent in the molecule itself through the different states ammonia and urea assume when bombarded with radiation. Atmospheric ammonia and/or urea could both absorb solar radiation from above and infrared radiation from below. At least in theory.

What is not theory is that once ammonia (or urea) falls back to Earth, it provides additional fertilizer to commercial farming operations and increases general vegetation densities. This in turn creates greater global atmospheric $CO_2$ absorption as well as additional reflectivity at ground level of the Sun's greatest energy output at the 555 nm range.

This utilization of the Haber process or other process in jet engines is not exhaustive—nor is the production of ammonia as a primary compound. The purpose of this patent is to suggest that modifying existing engine technology provides an alternative to Smith and Wegner which is both energy efficient and "free" in the sense that the pressures and temperatures created by aircraft engines are going to happen anyway—so why not leverage them through the Haber process or other processes to seed the atmosphere with reflective compounds?

Figure 1:
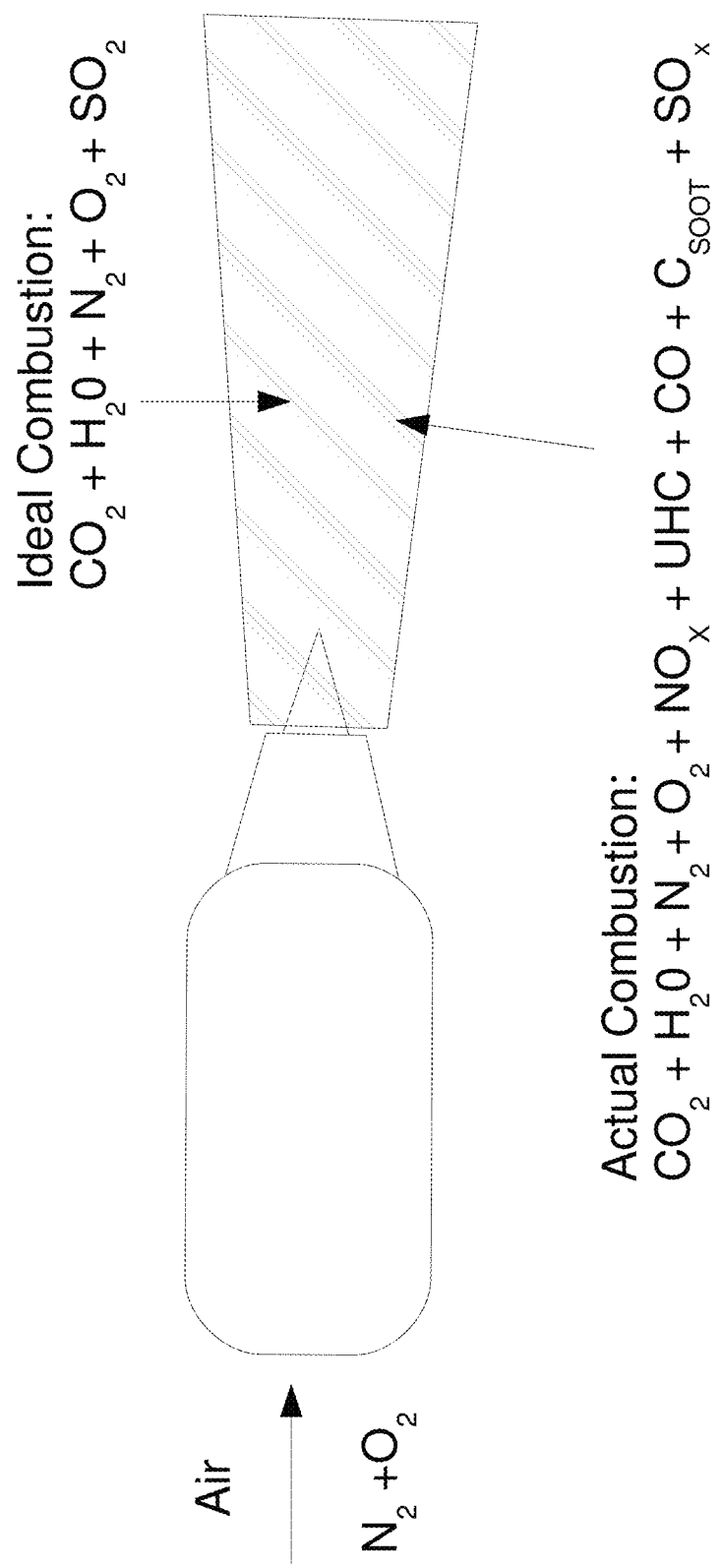
FIG. 1 is a description of the process of combustion in a jet engine and resulting compounds.
Figure 2:
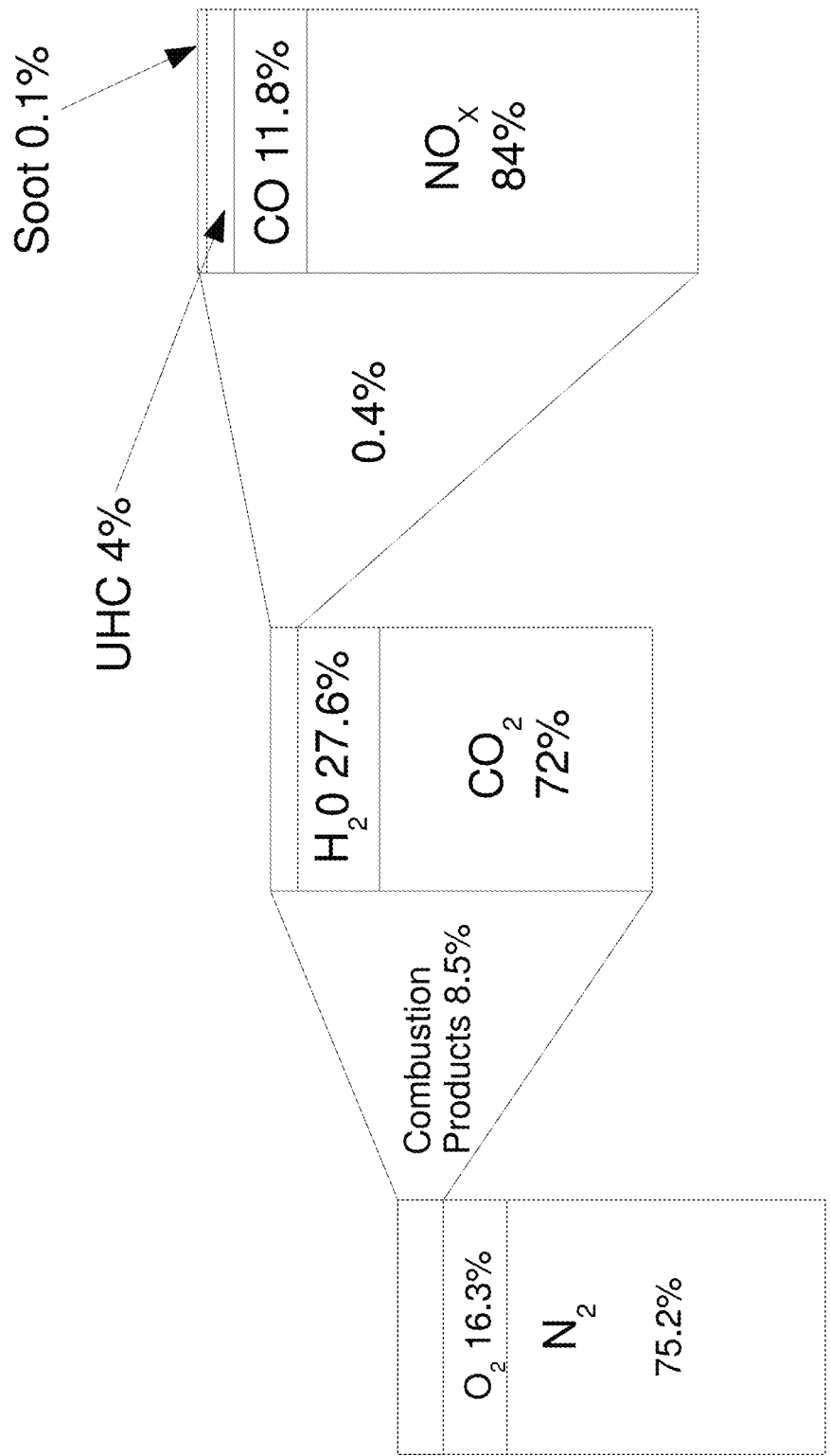
FIG. 2 is a breakdown of chemical compounds from a jet engine
Figure 3:
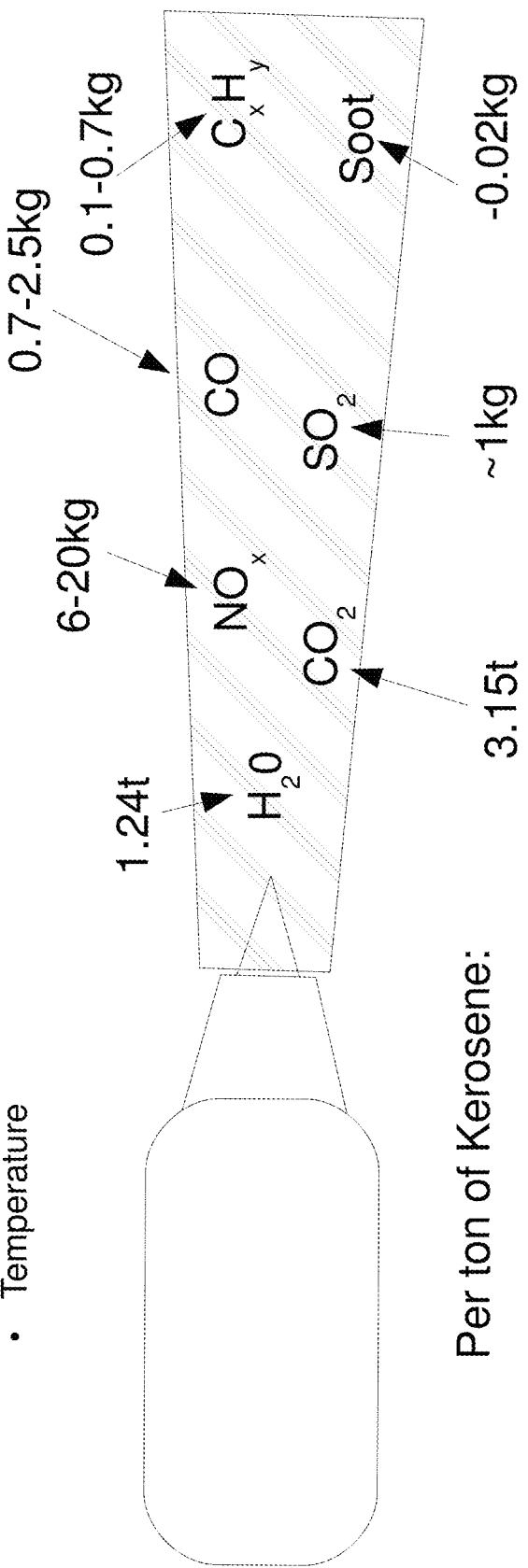
FIG. 3 is a breakdown of the relative amounts of chemical compounds produced from a jet engine FIG. 4 includes a potential list of additional compounds (and thrust) produced by a Hanson-Haber engine FIG. 5 describes the two potential pathways for the Hanson-Haber engine additions. Pathway A—stratospheric solids and Pathway B—additional thrust. Pathway A shows how the Haber Process creates a) ammonia, b) urea, and c) utilizing engine heat and pressure could be used to partially dry urea to crystalline form for ejection from the engine into the aircraft contrail. Pathway B shows the linkage of the Haber Process to an ammonia combustion chamber and to a secondary engine which utilizes the nitrous oxide from ammonia catalysis ($N_2O$) to supercharge combustion.
Figure 4:
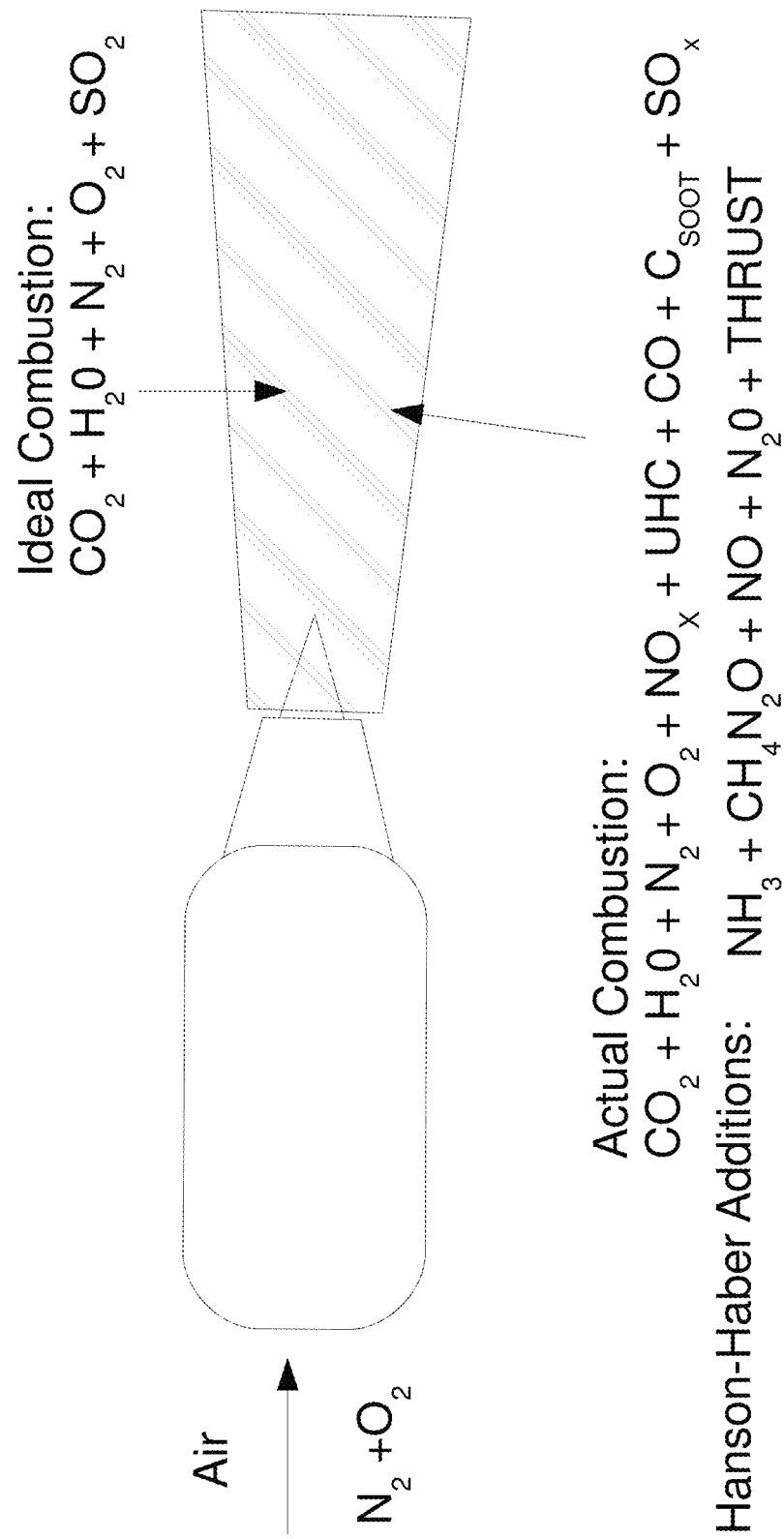
Figure 5:
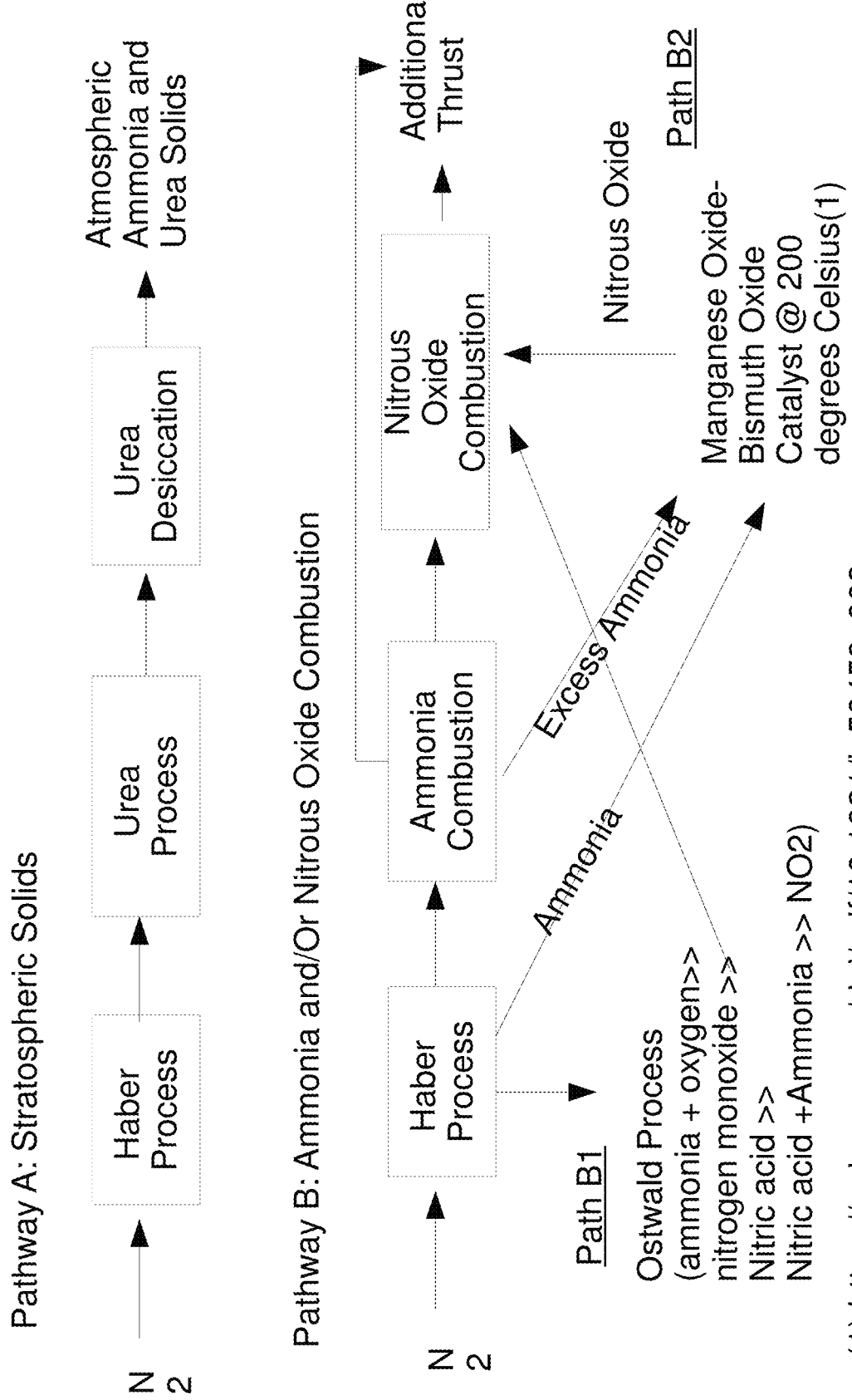

The chemistry is not complex. The substrates and catalysts required are not expensive. The industrial processes are known quantities and easily reproducible in a cannular (or other type of) reaction chamber and only require an increase in pressure and down-stream reduction in temperature to create ideal conditions for "first pass" ammonia production which has an approximately 15% efficiency of conversion (Pathway B—see FIG. 5).

What this means is when you multiply the number of annual flight hours by the volume of atmospheric nitrogen passing through commercial jet engines, you have the potential to seed the atmosphere with thousands of tons of reflective compounds per day at a minimal cost—as well as increase the overall reflective surface of the Earth and increase the $CO_2$ sink of available vegetation globally.

In addition to the previous point, leveraging atmospheric nitrogen to produce down-stream combustible ammonia liquid or gas as well as (through different pathways) nitrous oxide capable of "supercharging" additional combustion—should provide, for the foreseeable future, additional fuel economy to aircraft—simply by using the strong bond of $N_2$ as a base.

While the work of Smith and Wegner advocated for an as-yet-to-be built aircraft to spray $SO_2$ compounds into the upper stratosphere, it occurred to this inventor that we already have an adequate delivery system for a variety of compounds into the stratosphere via commercial aircraft.

With the addition of what is analogous to the catalytic converter on a car to existing jet engine technology, aircraft can commence atmospheric seeding with a few engineering tweaks and leveraging the reflectivity and non-toxicity of two relatively innocuous compounds (ammonia and urea).

Historical Background of the Invention

There was an article post 9/11 on the temperature related effects of grounding aircraft. A summary of what was effectively a global "climate change experiment" can be found in the article in the footnote.[8] The main study however was an article by Andrew Carleton, David Travis and Ryan G. Lauristen.[9]

The Carleton article stated that in the three days following 9/11 there was a temperature differential which could not be accounted for by a one-day shift in weather systems, but could be accounted for by the absence of the reflectivity of jet contrails.

Carleton, Travis, and Lauristen were able to show that "there was an anomalous increase in the average diurnal temperature range (that is, the difference between the day-time maximum and night-time minimum temperatures) for the period 11-14 Sep. 2001. Because persisting contrails can reduce the transfer of both incoming solar and outgoing infrared radiation and so reduce the daily temperature range, [they attributed] at least a portion of this anomaly to the absence of contrails over this period."[10]

What this means is that in the three days following 9/11 a large portion of the Earth had no jet contrails. "Contrails depress the difference between daytime and nighttime temperatures, typically decreasing the maximum temperature and raising the minimum temperature. In this respect, the contrail clouds mimic the effect of ordinary clouds,"[11] meaning that contrails tend to stabilize temperatures and have been alternately lauded for reflecting sunlight back out into space, and derided for reflecting infrared radiation back towards the Earth's surface thereby compounding global warming.

Smith and Wegner's proposal was to create a greater amount of reflectivity in the upper stratosphere using a substance which would reflect sunlight but allow (in theory) infrared radiation to exit—thus decreasing overall global atmospheric and surface temperatures. But as previously stated this plan has serious problems.

Jet Fuel and the Underlying Structures of Jet Engines

Jet A/A-1 "often contains additives to reduce the risk of icing or explosion due to high temperature, among other properties"[12] This application focuses on Jet A-1, which is used in all high-flying commercial aircraft due to its lower freezing point (−47 degrees Celsius), though similar processes could be used on Jet B fuel (naptha-kerosene blend) used in planes at lower atmospheric temperatures. For example, jet and turboprop engines, see FIG. 7.

Jet A-1 produces 43.15 MJ/kg, and has a density at 15° C. of 804 kg/m³. It is "a blend of over two thousand chemicals, primarily hydrocarbons (paraffins, olefins, naphthenes, and aromatics), additives such as antioxidants and metal deactivators, biocides, static reducers, icing inhibitors, corrosion inhibitors, and impurities."[13] The study by Smith and Wagner calls for injection of $SO_2$ compounds into the stratosphere at 20 km, whereas with some subtle tweaks to existing the primary chemical composition of jet fuel as well as the addition of substrate and catalysts to commercial jet engines, you could effectively get "free" dispersion of required compounds into the stratosphere. This invention attempts to codify those modifications into a patentable framework without attempting to patent any existing jet engine or Haber Process technology.

The main compounds in kerosene A-1 are kerosene and gasoline. Though the table available on page 7 of the JP-4 manual available in the footnote is useful in thinking about which specific compounds could be leveraged for production of secondary and tertiary reflective compounds downstream from the engine itself.[14] (For example, high atmospheric aircraft could leverage 2-Methylhexane[15] or other high-flashpoint compounds in engines or separate reaction chambers to create more efficient processes.)

The output of a jet engine can be seen in FIGS. 1-3.

Due to the heat and pressure available in a jet engine (2000 degrees C.) and pressure (compression ratios of 40:1) this leaves some interesting engineering possibilities available which this patent seeks to cover.

In a jet engine, the compression is done by a relatively simple process—the turbofans decrease in size, and pressure increases as a function of airspeed (the rate at which the air molecules enter the engine) but also the rate at which the turbofans are spinning and forcing the air through the engine, as well as the rate of compression (length of the engine combined with the decrease in diameter).

The compression also has another effect—it heats the air as it speeds up. This is important to the functioning of a jet engine in that air temperature at 32,000 feet is often −40 degrees C. However, in order for a jet engine to function, air temperature needs to increase from −40 to 2000 degrees C. almost instantly. This process is handled primarily > in the combustion chamber, [where] fuel is mixed with air to produce the bang, which is responsible for the expansion that forces the air into the turbine. Inside the typical commercial jet engine, the fuel burns in the combustion chamber at up to 2000 degrees Celsius. The temperature at which metals in this part of the engine start to melt is 1300 degrees Celsius, so advanced cooling techniques must be used. The combustion chamber has the difficult task of burning large quantities of fuel, supplied through fuel spray nozzles, with extensive volumes of air, supplied by the compressor, and releasing the resulting heat in such a manner that the air is expanded and accelerated to give a smooth stream of uniformly heated gas. This task must be accomplished with the minimum loss in pressure and with the maximum heat release within the limited space available. The amount of fuel added to the air will depend upon the temperature rise required. However, the maximum temperature is limited to certain range dictated by the materials from which the turbine blades and nozzles are made. The air has already been heated to between 200 and 550° C. by the work done in the compressor, giving a temperature rise requirement of around 650 to 1150° C. from the combustion process. Since the gas temperature determines the engine thrust, the combustion chamber must be capable of maintaining stable and efficient combustion over a wide range of engine operating conditions. The air brought in by the fan that does not go through the core of the engine and is thus not used for combustion, which amounts to about 60 percent of the total airflow, is introduced progressively into the flame tube to lower the temperature inside the combustor and cool the walls of the flame tube."[16]

So in effect, compression gets you part of the way there, combustion does the rest, and the fuel mixture is adjusted dynamically via sensors to create stable temperatures, while the majority of the airflow is sent around the outside of the combustion chamber apparatus to cool the engine.

The Haber Process

One thing that has not been taken advantage of in commercial aircraft engines is something very simple. Atmospheric nitrogen. The majority of atmospheric nitrogen enters the jet engine as $N_2$ and exits as $N_2$.

In 1910 the Haber process was invented by Carl Haber. BASF bought the process and provided the funding for Haber and Bosch to make it industrially viable.[17] Today, the Haber process is the primary vector (aside from naturally occurring bacteria in the soil and in the roots of legumes) for the creation of ammonia and downstream nitrates used in fertilizer.

In the Haber process, ammonia is produced at 2600-3200 psi at temperatures from 400-500 degrees C., and "as the gases (nitrogen and hydrogen) are passed over four beds of catalyst, with cooling between each pass so as to maintain a reasonable equilibrium constant. On each pass only about 15% conversion occurs, but any unreacted gases are recycled, and eventually an overall conversion of 97% is achieved."[18]

In an aircraft engine, while the pressures are lower, the area directly above the combustion chamber is an ideal place to create a Haber process. Cooling can be adjusted dynamically to create the appropriate temperature range, and excess heat can be used to create the higher pressures required by the Haber Process itself. Excess hydrocarbons not used in the primary combustion can be repurposed, and so on.

In the simplest of terms, this invention seeks to take the structure of an aircraft engine and marry it to the structure of a Haber Process (FIG. 6).

The porous nature of the walls of the combustion chamber in jet engines (as can be seen in U.S. Pat. No. 4,446,693A) allow for this possibility. At the moment, "cooling air" (60% of the air mass which enters the engine) goes around the engine intake is sent downward toward the combustion chamber to cool the ceramic tiles and regulate the temperatures in the combustion chamber/flame tube. But what if heat from the engine was instead reflected partially upward to power the Haber Process—or other processes?

In other words, the ideal place for the Haber Process is in a cannular structure around the high-temperature/high-compression area of an aircraft engine. An example of the location of the proposed area for the Hanson-Haber process can be seen in FIG. 8 on a Rolls-Royce XWB-97 engine. In the side-view wire-frames in FIG. 9, the Haber Process would be set above either the HP compressor, HP Turbine, or LP Turbine area depending on where highest temperatures occur. For purposes of this patent, the Haber Process is set above the HP Compressor, but could be moved fore or aft depending on differences in aircraft engine designs.

In the Haber Process diagram in FIG. 6, the work of the compressor is handled partially by the engine itself as the airflow enters the engine, in part by the heat generated by the combustion chamber, and in part by mechanical action (rotation) of the turbines. The generation of temperatures required for the Haber Process is handled primarily through heat generated by combustion in the main engine.

Figure 6:
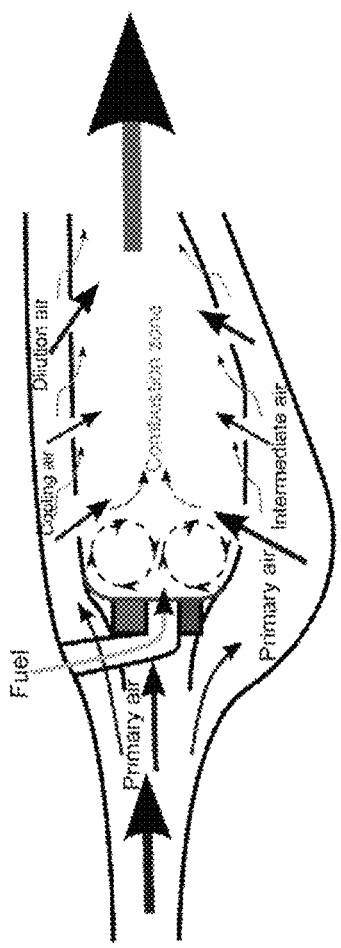
FIG. 6 Illustrates basic jet engine structure and basic Haber Process structure
Figure 6:
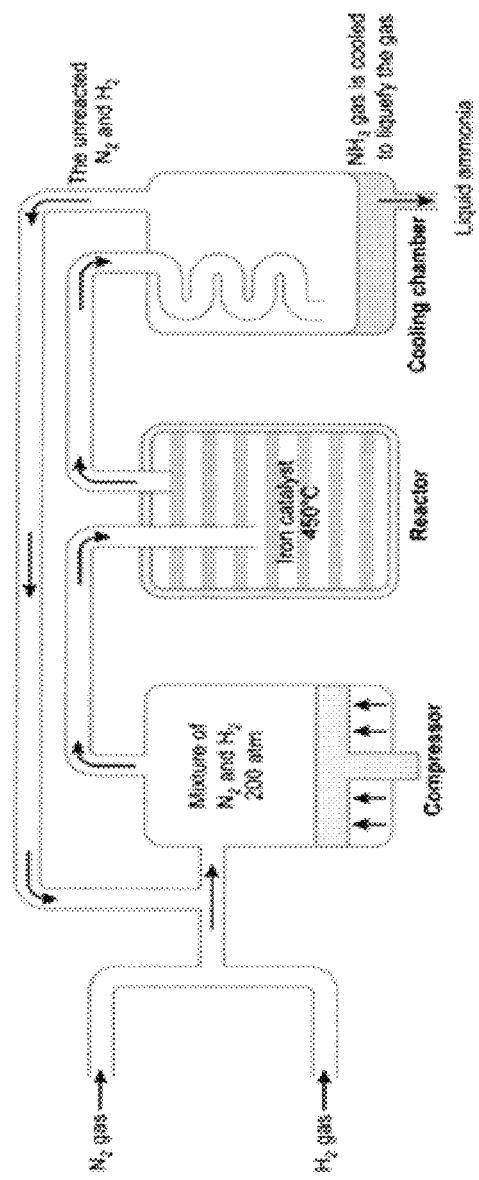

In effect, this invention also proposes to provide some dynamic cooling to jet engines THROUGH the Haber process. What that means is taking the energy requirements of the Haber process in breaking the strong bonds of free atmospheric nitrogen and using those energy requirements to cool the engine. In effect, the Haber Process could partially take the place of "cooling air" which "goes around" the combustion chamber (cooling air and dilution air in FIG. 6).

The Haber Process and Cannular Structures

The most effective way to implement the Haber Process above the combustion chamber is to repurpose an existing design element of aircraft engines. Specifically, the "canular" combustion type. Cannular combustors (FIG. 7) have discrete combustion zones contained in separate liners with their own fuel injectors. Unlike the can combustor, all the combustion zones share a common ring (annulus) casing. Each combustion zone no longer has to serve as a pressure vessel. The combustion zones can also "communicate" with each other via liner holes or connecting tubes that allow some air to flow circumferentially. The exit flow from the cannular combustor generally has a more uniform temperature profile, which is better for the turbine section. It also eliminates the need for each chamber to have its own igniter. Once the fire is lit in one or two cans, it can easily spread to and ignite the others. This type of combustor is also lighter than the can type, and has a lower pressure drop (on the order of 6%). However, a cannular combustor can be more difficult to maintain than a can combustor. An example of a gas turbine engine utilizing a cannular combustor is the General Electric J79. The Pratt & Whitney JT8D and the Rolls-Royce Tay turbofans use this type of combustor as well."[19]

Figure 7:
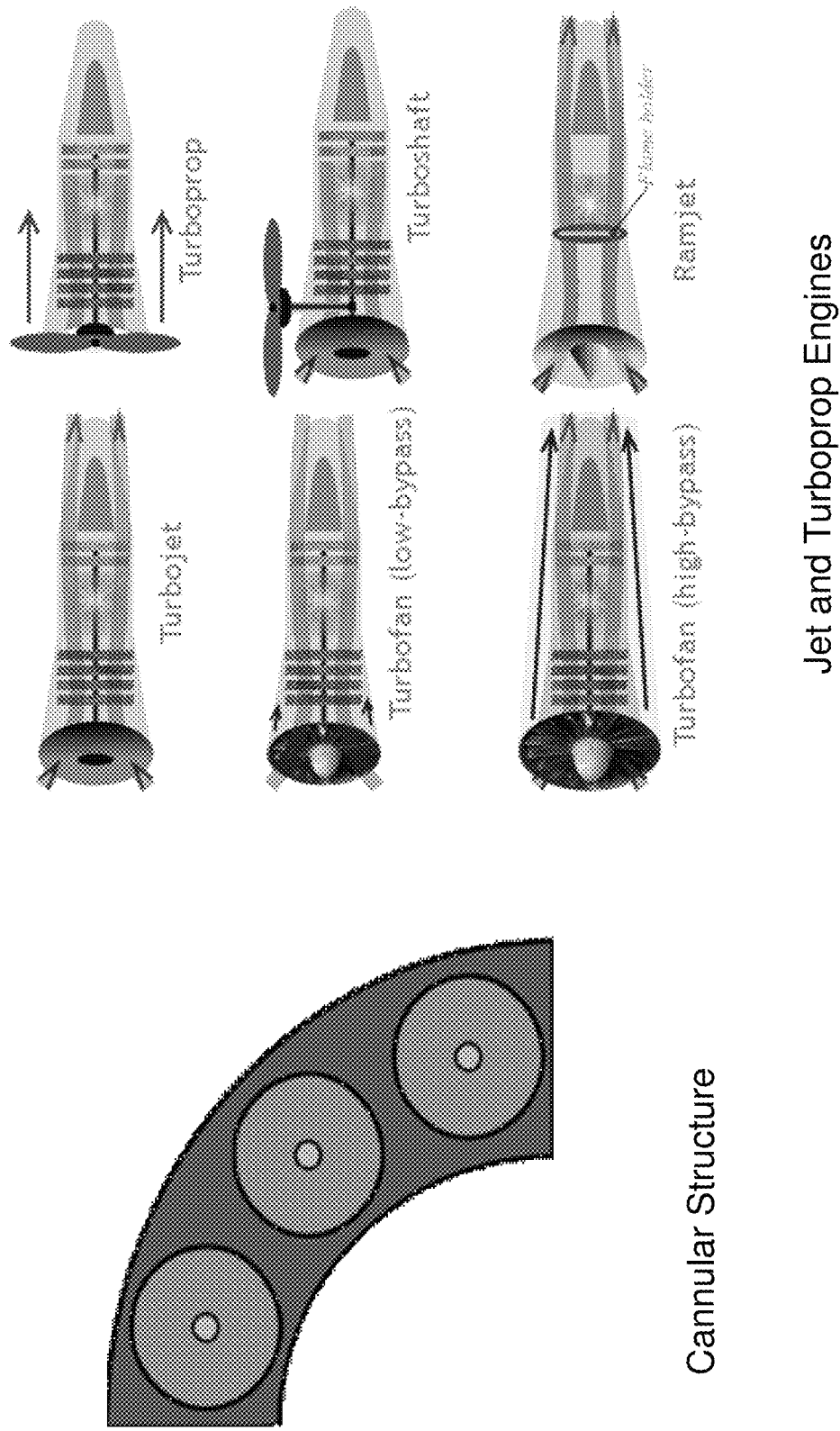
FIG. 7 Illustrates cannular structure[2] and the various types of jet engines and turboprop engines[3] to which the Hanson-Haber engine process might eventually be applied FIG. 8 Is a diagram of a sample aircraft engine (Rolls-Royce Trent XWB 97)[4] for purposes of highlighting where the Hanson-Haber process would occur in a jet engine currently in production
Figure 8:
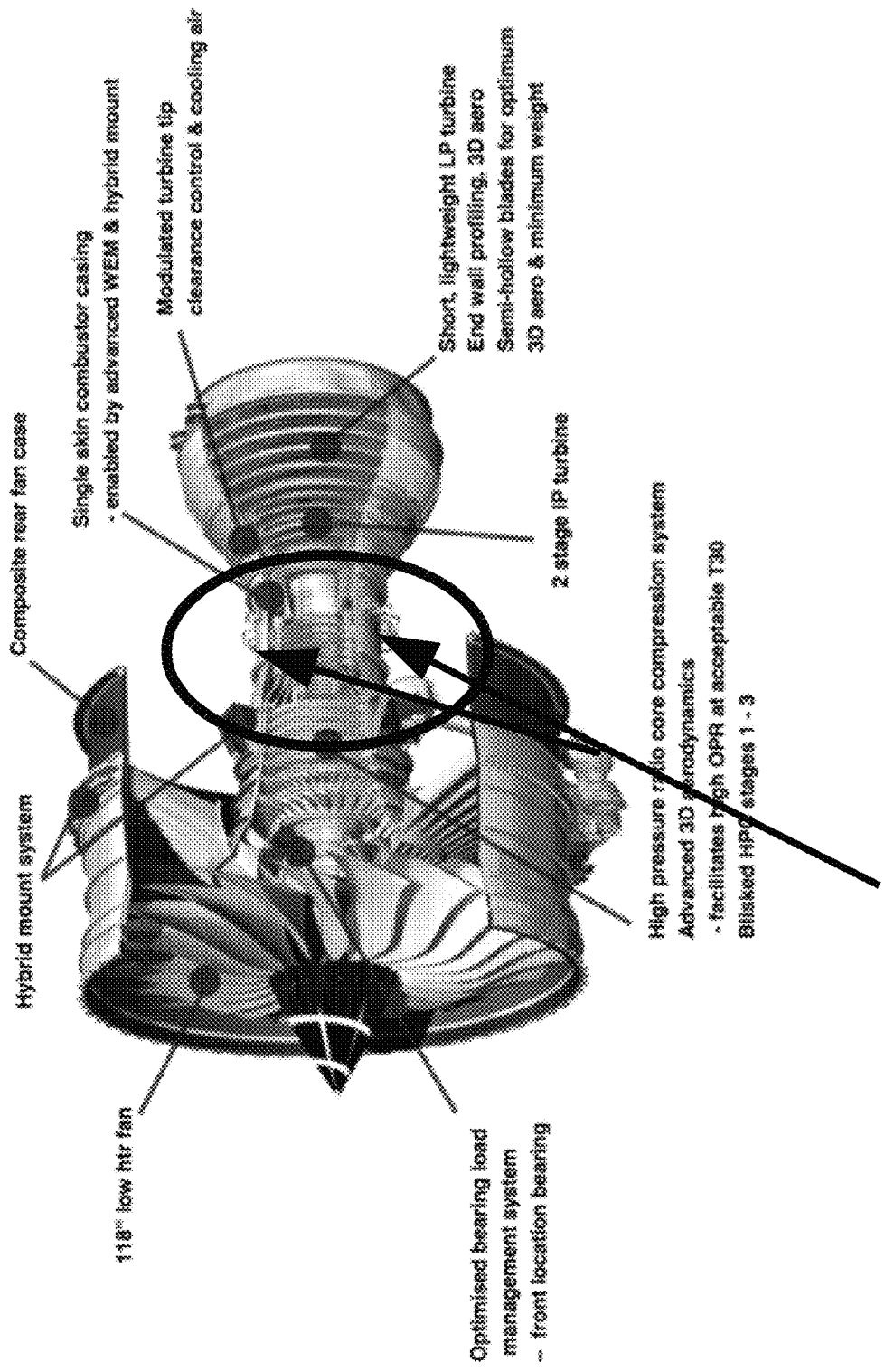
Figure 9:
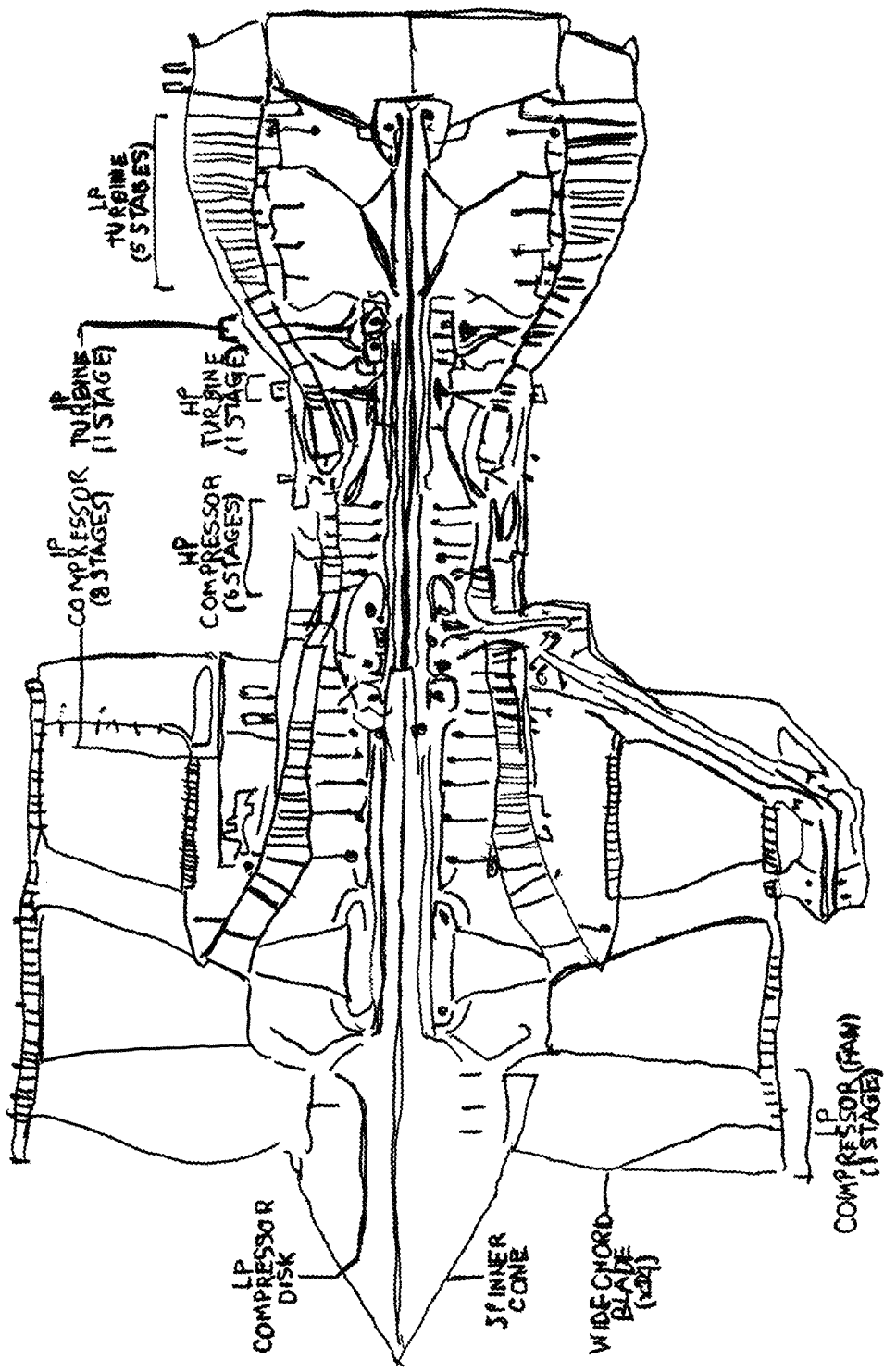
FIG. 9 is a wireframe side view of a modern aircraft engine with high-temperature and high pressure areas indicated
Figure 10:
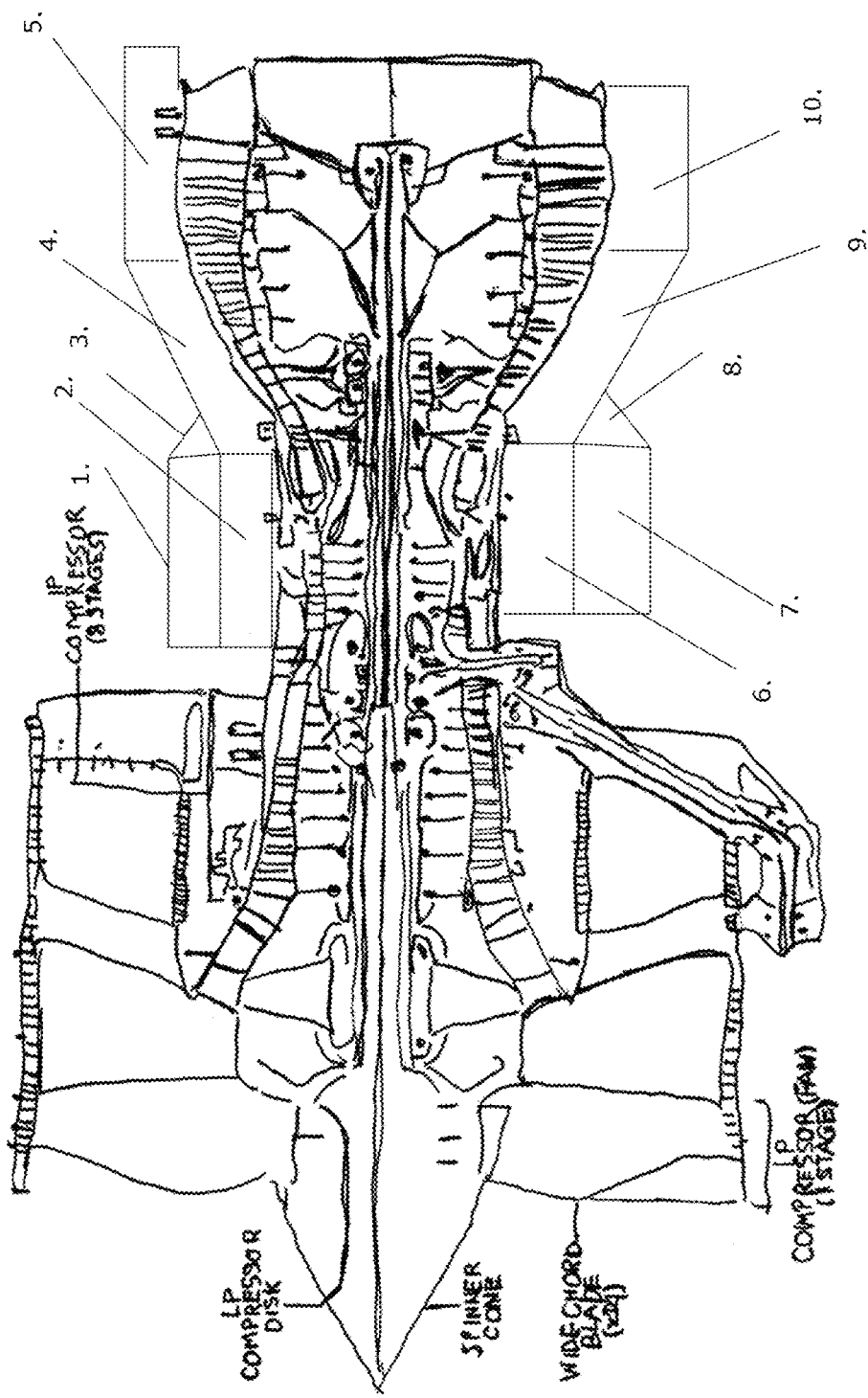
FIG. 10 is a sketch of the location of the Hanson-Haber high temperature single pass cannular structure on the same wire-frame diagram. Pathway B is the top configuration, Pathway A is the bottom configuration. In Pathway B—Additional Thrust, #1 is the cannular Haber Process, #2 is a dedicated Haber Process cannular chamber at higher temperatures and pressures, #3 is the channel where the dedicated higher temperature and higher pressure Haber Process ammonia is ported to #4, which is the ammonia combustion chamber or alternatively where ammonia is ported downwards into the combustion chamber of the main engine itself and #5 is nitrous oxide production which can either be combusted in situ with jet fuel or other fuels or can be sent back to either the ammonia combustion chamber or the main engine combustion chamber. Pathway A (lower configuration) has the same basic structure where #6 is the Haber Process closest to the combustion chamber, #7 is a dedicated Haber Process at higher pressures and temperatures, #8 is the channel for ammonia from the dedicated Haber Process to pass into #9, which is the urea production chamber which is then passed to #10, the urea desiccation chamber which utilizes spare heat from the main engine for desiccation.
Figure 11:
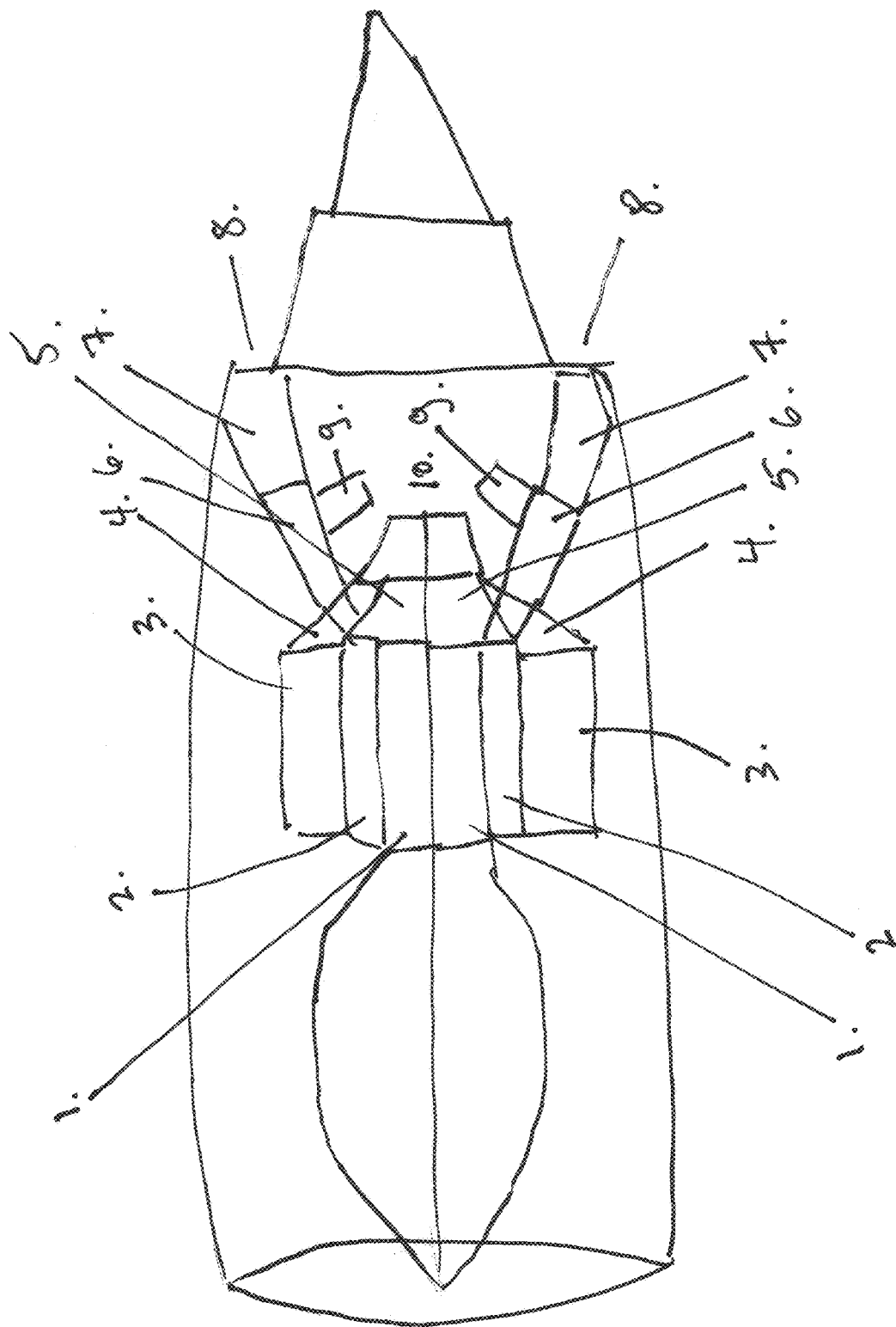
FIG. 11 is an alternate wireframe side view of Pathway B (Thrust). #1 would be the high-temperature/high pressure area of the jet engine. #2 would be the initial Haber Process started by high engine temperatures, #3 would be higher temperature, higher pressure, higher efficiency Haber Process fed partially by the energy production in #2, #4 would be the ammonia bypass chamber from #3 to #5. And #5 would be an ammonia combustion chamber. #6 would be a nitrous oxide creation chamber which could either be ported directly into the main combustion area of the engine (#10) via nozzles at #9, or into a secondary (Jet A, ammonia/methane mix, or other fuels) combustion chamber #7 which produces thrust at #8.
Figure 12:
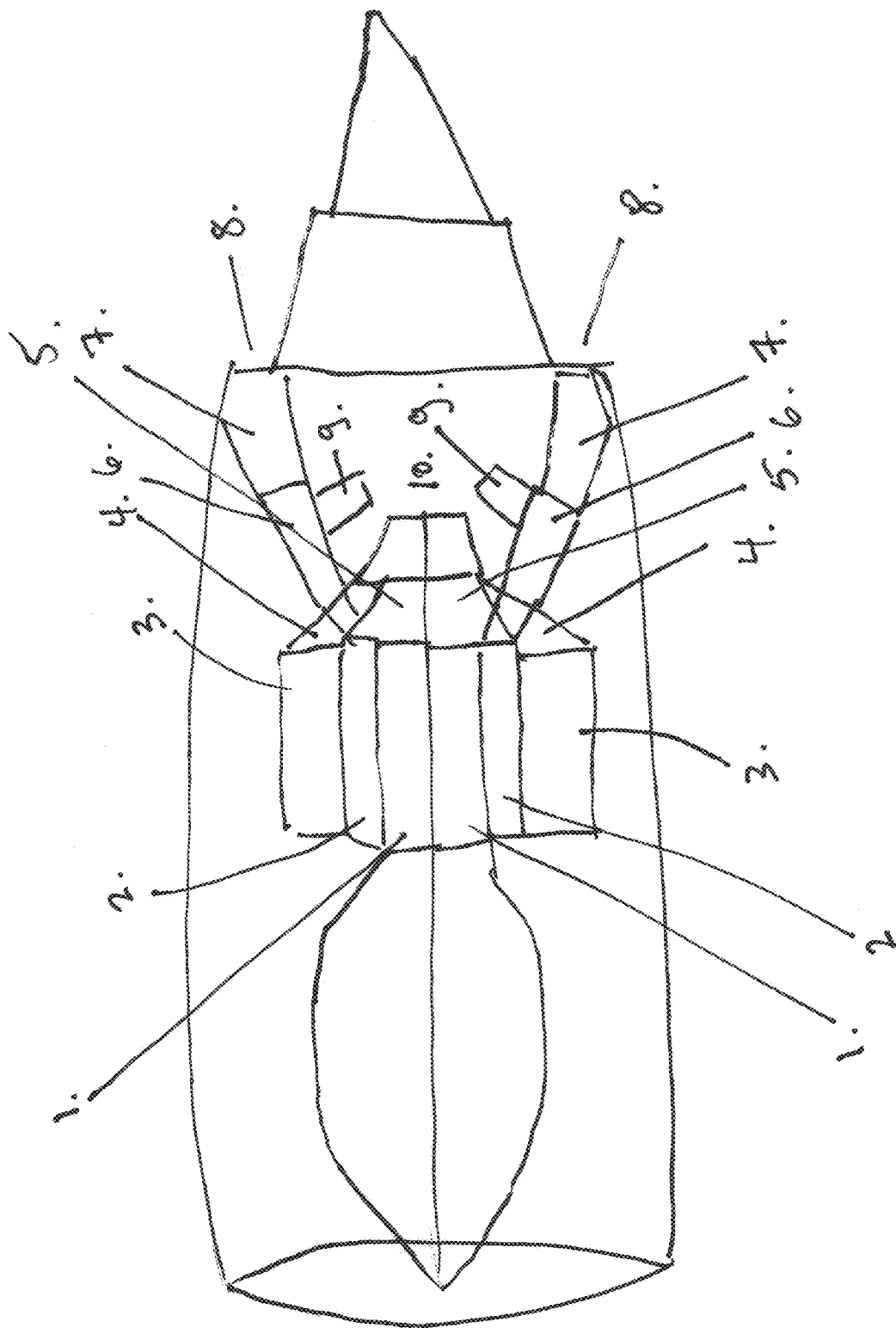
FIG. 12 is the same diagram as FIG. 11, but repurposed for particulate dispersion (Pathway A), where #1 would be the high-temperature/high pressure area of the jet engine. #2 would be the initial Haber Process, #3 would be higher temperature, higher pressure, higher efficiency Haber Process, #4 would be the ammonia bypass chamber from #3 to #5. And #5 would be a Urea production chamber ($CO_2$+ $NH_3$). #6 would be Urea distillation and flash drum, and/or vacuum evaporator, and #7 a miniature Prillig tower. #5, #6, and #7 can be combined or repurposed for the different steps in the urea production process.[5] The procedure should produce a mixture of Ammonia and Urea at #8.
Figure 13:
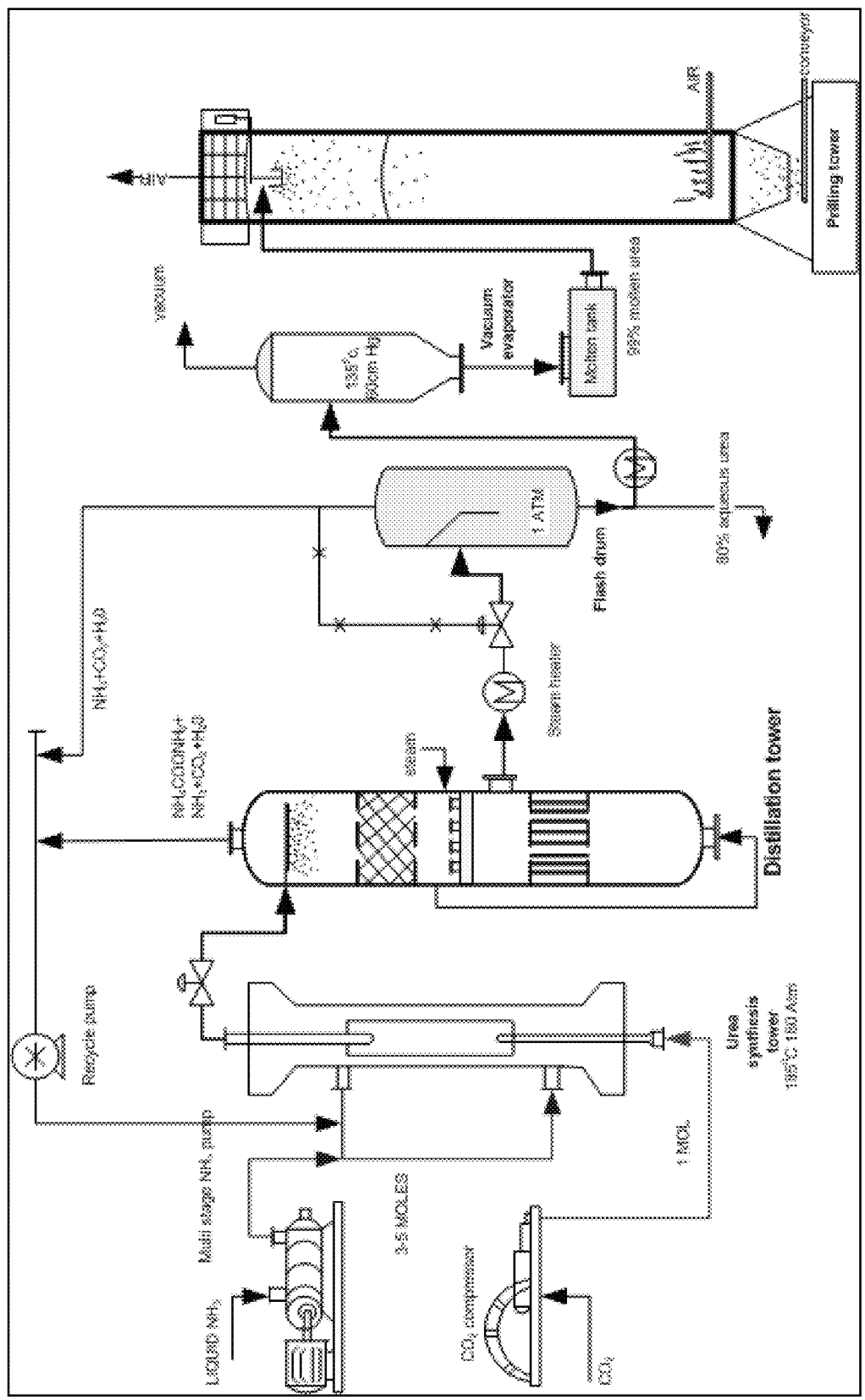
FIG. 13 is a diagram of the urea production process[6] included for reference.
Figure 14:
FIG. 14 is a diagram of aircraft routes for a single airline and gives the reader an idea of how widespread ammonia/urea might affect long-term fertilization of land underneath aircraft routes.

In other words, if engineers take the cannular combustion chambers in FIG. 7 and replace them with chambers containing Haber processes, and wrap them around the combustion chamber, this should allow for a more stable pressures, and a more uniform temperature profile in each Haber Process chamber. The result is a secondary cowling around the combustion chamber dedicated to heat reduction of the main engine combustion chamber while at the same time activating the Haber Process.

The following temperature chart lists the reaction temperatures and output for various levels of ammonia output during the Haber Process ($K_p(T)$ for $N_2 + 3 H_2 \rightleftharpoons 2NH_3$)[20]

| Temperature (° C.) | Kp |
|---|---|
| 300 | 4.34 × 10−3 |
| 400 | 1.64 × 10−4 |
| 450 | 4.51 × 10−5 |
| 500 | 1.45 × 10−5 |
| 550 | 5.38 × 10−6 |
| 600 | 2.25 × 10−6 |

What this means is that with the temperatures available inside a jet engine at the location of the High Temperature Combustion Area (or analogous structures in other jet engines by other manufacturers—see FIG. 7), all the engine needs to create the Haber Process is a) sufficient airflow and sufficient pressures and b) a ferrous (or other) catalyst (which would function in an analogous fashion to a catalytic converter). This would take atmospheric nitrogen from the airflow, pass it over a catalyst in the presence of hydrocarbons (either from Jet-A, Jet-A1 or dedicated methane injection), and create ammonia.

There are several catalysts which are currently available for the Haber Process, including osmium, ruthenium-based catalysts (which reduce hydrogen poisoning of the catalyst[21] and allow for lower operating pressures), and uranium. Catalysts degrade over time, but iron-based catalysts are relatively inexpensive to produce and replace.

There are many commercially available ammonia/Haber processes available. Existing technology which could be adapted to aircraft engines either in a cannular configuration or otherwise.

Commercial Application of the Invention

There are two interesting things which happen in the creation of ammonia which would make this process appealing to both commercial airline companies and aircraft engine manufacturers.

The first is the release of additional energy from the breaking of the Nitrogen bonds which could theoretically be used to provide additional power to the engine and/or power/recharge batteries in partially or fully electric aircraft.[22] Additionally, the release of energy could be utilized in a secondary, and more efficient Haber Process sitting just above the initial Haber Process in a secondary cannular chamber surrounding the first. In the Haber Process, higher pressures and higher temperatures increase the conversion ratio. In other words, it would be possible to use the output of the first Haber process cannular ring powered by the combustion of the jet engine to power a secondary more efficient cannular ring just above it.

The second, and perhaps the most appealing part of this process is that ammonia could also be potentially used as an additional "free" fuel source for aircraft, as ammonia could be ignited in downstream combustion chambers.[23] In short, the production of ammonia through annealing the Haber process to existing engines could produce incredible fuel economy.

The equation for the Haber Process is exothermic (negative delta H).

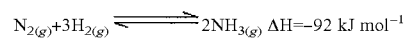

$$N_{2(g)} + 3H_{2(g)} \rightleftharpoons 2NH_{3(g)} \quad \Delta H = -92 \text{ kJ mol}^{-1}$$

Potential down-stream compounds (See FIG. 5) such as nitrous oxide, coupled with additional fuel in additional downstream combustion chambers would "allow the engine to burn more fuel by providing more oxygen than air alone, resulting in a more powerful combustion [and] . . . deliver more oxygen than atmospheric air by breaking down at elevated temperatures. Therefore, [nitrous oxide is] often is mixed with another fuel that is easier to deflagrate. Nitrous oxide is a strong oxidant, roughly equivalent to hydrogen peroxide, and much stronger than oxygen gas."[24]

The third thing which is useful in the process is that in the presence of $CO_2$ (freely available in the engine exhaust), coupled with NH3 can produce ammonium carbonate. With a bit of additional heat and pressure (also available to spare in the engine itself) you get urea. Which is, effectively, fertilizer.

So with a bit of chemical wizardry, the addition of "free" heat and pressure from the jet engine, free atmospheric nitrogen, and a few inexpensive substrates, you get an aircraft engine that is not only highly efficient but could quite effectively spew fertilizer. Not a great deal of fertilizer, as a "first pass" flow of $N_2$ through an ammonia reactor (about all you have time for considering the speed of airflow through a jet engine) and across substrates only operates at 15% efficiency.

If a system of this type were looped (say, on an aircraft dedicated to atmospheric seeding at higher altitudes)—or as previously suggested in a secondary Haber Process sitting above the first—you could potentially achieve 97% efficiency.

However, with a 15% efficiency single-pass converter multiplied by the number of aircraft flight hours per flight multiplied by the number of flights globally on an annual basis—is enough to produce vaporized ammonia (or other compounds) in the megaton range in the upper atmosphere (10 km) which would far outstrip Smith and Wegner's solution in cost effectiveness and time required to implement—and/or produce incredible fuel economy.

Additionally, as mentioned above in paragraph 66, free production of $CO_2$ in engine exhaust allows for the possibility of instantaneous production of urea (liquid form)—ammonium carbamate. Ammonium carbamate synthesis reactors require temperatures of 150-200 degrees Celsius and pressure of 150 bar.[25] The temperature and pressure required is well within the parameters downstream from the combustion chamber of a jet engine from excess heat and existing pressures.

Additionally, liquid urea could then be quickly dried in the last section of the engine (from excess heat) to produce micro-crystalline urea. A description of the entire process is available through the link in the footnote[26] and more visually in FIG. 13. To summarize, at "pressures above its dissociation pressures the formation of ammonium carbamate is fast and complete . . . [however] carbamate dehydration sequence is slower . . . ."[27] So the ejection of urea from the engine housing into the contrail is likely to be a mix of liquid urea and crystalline urea regardless of temperatures achieved downstream of the urea generation process—unless the un-crystallized carbamate gas is recycled and re-pressurized for additional passes through the desiccation process (as would be possible on dedicated stratospheric seeding vehicles).

If the Haber Process is further modified as described above to produce urea you have a chemical which is both radiation-absorptive and relatively inert. Unlike $SO_2$ compounds, and ammonia gas, urea is "a colorless, odorless solid, highly soluble in water, and practically non-toxic and . . . has the highest nitrogen content of all solid nitrogenous fertilizers in common use"[28]

In addition to the non-toxic nature of urea, urea has a high absorptive capability.[29] While most studies available focus on absorption/reflectivity of radiation in industrial applications, the consensus appears to be that urea is also a cost-effective absorption material. "Microwave absorbers are the materials synthesized to absorb the unwanted electromagnetic energy with the main criteria being that the material light weight, and chemically stable matrix, with high ability to absorb microwave radiation"[30] Urea fits this definition as a chemically stable compound.

Ammonia also fits this definition due to its tetrahedral structure.[31] Effectively, ammonia acts as a kind of potential tetrahedral radiation sink. Urea crystals also fit into this class of compounds.

If only ammonia is used, it should be noted that ammonia, because it is tetrahedral, may occupy several different rotational states.[32] While it is beyond the scope of this application to describe inversion spectra, hyperfine splitting, quadropole splitting, and so on, suffice to say that ammonia and its potential derivatives provide a potential energy sink for both solar energy coming from outside the atmosphere, as well as infrared energy reflected skyward from the earth's surface.

So the final step in all of this is thinking a bit about what happens if you start seeding the planet (or at least the most common airplane routes) with large amounts of vaporized airborne ammonia and urea. The counter-argument is going to be—we already have more fertilizer in lakes and rivers and adding more will only create more problems. This is true, in part.

If this invention is utilized on a wide scale, eventually a great deal of ammonia compounds and/or urea fertilizer will fall to earth. However, the additional fertilizer (whether mixed with rain, or in hyperfine crystal form) will cause increased plant productivity, particularly in plants in nitrogen-poor or nitrogen-depleted areas. The main causes of fertilizer runoff are actually due to the structure of farmland and the tendency of farmland to produce runoff. Over forests or grassland which are not irrigated and where topsoil remains in place, additional nitrogen will also tend to stay in place. And therefore be absorbed by plants and trees, in place.

The result of that should be both increased plant productivity in commercial farming as well as an increase in the overall surface area of reflective surfaces in the 555 nm range. I.e. the leaves of plants.

Plants and the Nature of Solar Radiation Absorption

It seems likely that many millions of years ago, plants adapted dynamically to the primary output of our sun. Radiation in the 555 nm range. Green light, in other words. So for millions of years plants have protected themselves dynamically from radiation damage by reflecting the sun's most powerful radiation band—and by extension have prevented the sun's highest level of radiation from ever reaching the Earth's surface.

Setting aside comet impacts and other theories for the last Ice Age, it is likely that the "green planet and blue planet" (as Earth must have looked from space millions of years ago) reflected a significant amount of radiation in the sun's most powerful band—which helped to mitigate global temperatures.

As mankind has urbanized, many of those green reflective surfaces—fields of grass, leaves of trees and plants, particularly in the rainforests—have disappeared. So the "ground based reflection mirrors" of the sun's primary energy output have been replaced by black asphalt, dark buildings, and bare, or scorched, earth—all of which absorb the 555 nm band quite nicely.

So short of a future world in with entirely "green" asphalt and green buildings (pun intended)—increased plant life on the Earth's surface may actually be one of our greatest weapons against global warming.

Aside from the more obvious $CO_2$ conversion mechanism in plants, the "reflective mirrors" of denser vegetation (thanks to increased ammonia/urea levels in the ground which this invention would produce) will also assist in lowering global temperatures. An important aspect of this invention is the attempt to increase overall vegetation density.

To that end the inclusion of Hanson-Haber engines (as proposed) on commercial aircraft at standard cruising altitudes distributing ammonia or urea should over time create both an easily renewable energy absorption layer in the stratosphere as well as increased vegetation (resulting in greater $CO_2$ absorption and greater reflectivity) on the ground.

While the Smith and Wegner study proposes new and expensive aircraft designs, and effectively putting "lipstick on the bear"—and failing to solve the problem of the increase of carbon compounds in the atmosphere—this invention proposes modifying existing engine designs. Neither the substrates and catalysts nor the manufacture of the proposed engine improvements will be prohibitively expensive and can be cost-allocated by industry as a fuel-saving measure or by government as a subsidy, or both.

Modifying engine designs to include the Hanson-Haber process need not be restrictive; in fact, the primary purpose of this application is to suggest that there may be other existing industrial processes which rely on heat and pressure (which aircraft engines have in abundance, and actually waste) which could produce other compounds which would be advantageous either for their chemical properties (as an aid to plant growth) or energy-absorption properties (via atomic or chemical structure), or both, or to promote additional fuel economy of the engine itself.

Additionally, the chemical output of aircraft engines so closely resembles the primary building blocks of life it should be possible to build some type of primary bio-reactor (similar to what happens when certain inorganic compounds are electrified by lightning to produce organic compounds—the "origin of life" hypothesis) downstream of the combustion chamber—which suggest additional avenues for research. For example, introduction of copper ions into the exhaust stream or across different substrates could at least in theory produce cuprous or cupric compounds which could "green" the atmosphere resulting in additional 555 nm atmospheric reflectivity.

In summary, the possibilities presented by modern aircraft engines and the "free" temperatures and pressures available for the production of aerosolized liquids, gasses, or solid compounds which might be useful lowering global temperatures—are effectively endless. And at the very least, this invention should provide enormous fuel economy for any airline that uses Hanson-Haber engines.

While the third of these claims is relatively broad, in 400BC in India, the first steel was produced by finding the right amount of carbon to mix with iron and the introduction of the crucible.[33]

> Steel contains an iron concentration of 98 to 99 percent or more. The remainder is carbon—a small additive that makes a major difference in the metal's properties. In the centuries and millennia before the breakthroughs that built skyscrapers, civilizations tweaked and tinkered with smelting techniques to make iron, creeping ever closer to steel . . . but around 400 BC, Indian metalworkers invented a smelting method that happened to bond the perfect amount of carbon to iron. The key was a clay receptacle for the molten metal: a crucible. The workers put small wrought iron bars and charcoal bits into the crucibles, then sealed the containers and inserted them into a furnace. When they raised the furnace temperature via air blasts from bellows, the wrought iron melted and absorbed the carbon in the charcoal. When the crucibles cooled, ingots of pure steel lay inside.[34]

It is this inventor's suggestion that the modern aircraft engine is a kind of chemical crucible which has gone completely unnoticed to date. While this invention is effectively only adding a "crucible" to the overall equation of the jet engine or various commercial chemical process, the overall impact could be enormous—both on global warming and the future composition of the atmosphere. While the USPTO might not consider that addition worthy of a patent in its entirety, it's worthwhile to consider that patents have a limited duration, and eventually this insight will become the property of all mankind. And without this insight, the jet engine might have continued until the end of time under its current auspices as a transportation tool—and not a mobile and quite useful stratospheric chemical factory—and crucible.

It is entirely possible that the best use of this invention is not a present one, but rather one in the far future. If one subscribes to the "sterile world" hypothesis—it is actually planets devoid of life which are humanity's best hope for interstellar colonization. We can terraform those sterile worlds by seeding a planet with our own biome instead of having to adapt to foreign (and potentially deadly) bacteria, plant life, and so on. If that is true, then the Hanson-Haber engines (provided you have a ready source of nitrogen (atmospheric or otherwise) and hydrocarbons (or free hydrogen), may be one of the best possible vectors for seeding sterile soil with the nutrients necessary for life—and by extension the creation of stable earth-like biomes and atmospheres on distant worlds. You don't even need to look that far for an example—the moon, or Mars, would be an ideal place to attempt wide-scale seeding of this type. Even though Martian soil has a high concentration of chlorine, and low atmospheric nitrogen, and the moon has no atmosphere to speak of, there may be other worlds which have sufficient atmospheric nitrogen for plant life imported from Earth. As such, those worlds would require wide-spread fertilization (i.e breaking of the $N_2$ bond) in order to become viable for human habitation. What better way to do that than as a byproduct of something as simple as transportation?

However, if used in atmospheric seeding, the tetrahedral structure of ammonia (and/or urea), provides a significant energy sink inherent in the molecule itself through the different states the ammonia assumes when bombarded with radiation.

Atmospheric ammonia and/or urea could both absorb solar radiation from above and infrared radiation from below.

Once ammonia (or urea) falls back to Earth, it provides additional fertilizer to commercial farming operations and increases general vegetation densities which creates greater atmospheric $CO_2$ absorption as well as additional reflectivity at ground level of the Sun's greatest energy output at the 555 nm range.

This utilization of the Haber process or other process in jet engines is not exhaustive—nor is the production of ammonia as a primary compound. The purpose of this patent is to suggest that modifying existing engine technology provides an alternative to Smith and Wegner which is both energy efficient and "free" in the sense that the pressures and temperatures created by aircraft engines are going to happen anyway—so why not leverage them through the Hanson-Haber process or other processes to seed the atmosphere with reflective compounds (and produce additional fuel economy by creating "free" combustible gasses/liquids on the fly?

The chemistry is not complex. The substrates/catalysts required (primarily ferrous) are not expensive, are well known, and are in general use. The industrial processes are known quantities and easily reproducible in a reaction chamber. They only require an increase in pressure and down-stream reduction in temperature to create ideal conditions for "first pass" Haber Process ammonia production which has an approximately 15% efficiency of conversion.

What this means is when you multiply the number of annual flight hours by the volume of atmospheric nitrogen passing through commercial jet engines, you have the potential to seed the atmosphere with thousands of tons of reflective compounds per day at a minimal cost, as well as increase the overall reflective surface of the Earth, and increase the $CO_2$ sink of available vegetation globally.

If used commercially, the invention has the potential to save millions of gallons of jet fuel through the combustion of ammonia and down-stream ammonia compounds, and to reduce the overall fuel cost of aircraft operation.

Additionally, ammonia combustion produces less pollution—"it has a high octane rating (about 120 versus gasoline at 86-93). So it does not need an octane enhancer and can be used in high compression engines. Along with hydrogen, ammonia is the only fuel that has no carbon emission when combusted because it doesn't contain carbon. It may contribute a small amount of nitrous oxide emission . . . ."[35]

In summary, modern jet engines create the pressures and temperatures required for the Haber Process or other chemical processes requiring high pressures and temperatures. The Haber process produces ammonia, that ammonia can be combusted, transformed into down-stream ammonia compounds either for the purpose of creating fuel economy, seeding the atmosphere with reflective compounds, and providing greater vegetation densities at ground level which should, over time, reduce global warming through greater solar reflectivity and greater $CO_2$ absorption.

WORKS CITED

"2-Methylhexane." *Wikipedia*, Wikimedia Foundation, 29 Aug. 2017, en.wikipedia.org/wiki/2-Methylhexane.

"Aviation Fuel." *Wikipedia*, Wikimedia Foundation, 16 Jan. 2019, en.wikipedia.org/wiki/Aviation_fuel.

Cain, Patrick. "Empty Skies after 9/11 Set the Stage for an Unlikely Climate Change Experiment." *Global News*, Global News, 12 Sep. 2016, globalnews.ca/news/2934513/empty-skies-after-911-set-the-stage-for-an-unlikely-climate-change-experiment/experiment/.

"Combustor." *Wikipedia*, Wikimedia Foundation, 16 Aug. 2018, en.wikipedia.org/wiki/Combustor.

"First Flight of Rolls-Royce Trent XWB-97 Aero Engine; Highest Thrust, 3D-Printed Structure." *Green Car Congress*, 9 Nov. 2015, www.greencarcongress.com/2015/11/20151109-trentxwb.html.

"Flow Diagram of Urea Production Process from Ammonia and Carbon-Dioxide." *Engineers Guide*, enggyd.blogspot.com/2010/09/flow-diagram-of-urea-production-process.html.

"Haber Process." *Wikipedia*, Wikimedia Foundation, 16 Dec. 2018, en.wikipedia.org/wiki/Haber_process.

Hofstrand, Don. "Ammonia as a Transportation Fuel." *Agricultural Marketing Resource Center*, AgMRC Renewable Energy Newsletter, May 2009, www.agmrc.org/renewable-energy/renewable-energy/ammonia-as-a-transportation-fuel.

"Inversion Spectrum of Ammonia." *Inversion Spectrum of Ammonia*, University of Washington, courses.washington.edu/phys432NH3/ammonia_inversion.pdf. Information on geometry of ammonia molecule, and inversion spectra.

Isla, Miguel A, and Horacio A Irazoqui. "Simulation of a Urea Synthesis Reactor 1: Thermodynamic Framework." *EurekaMag: Life, Earth, and Health Sciences*, eurekamag.com/pdf/002/002492859.pdf. Background on dessication in Urea process.

"JET FUELS JP-4 AND JP-7; Section 3: Chemical and Physical Information." *CDC ATSDR: Agency for Toxic Substances and Disease Registry*, Center for Disease Control and Prevention, www.atsdr.cdc.gov/ToxProfiles/tp76-c3.pdf. Background information Knuth, Don. "Jet Engines: A Historical Introduction: How The Jet Engine Works." *Don Knuth's Home Page*, Stanford University, 16 Mar. 2004, cs.stanford.edu/people/eroberts/courses/ww2/projects/jet-airplanes/planes.html. Section on "Bang"

Mahalingam, Murugan. "Microwave Reflectivity Measurement of Silicon Urea Polyvinyl Alcohol/Epoxy Resin Composites in X and Ku Bands." *Research Gate*, December 2009, www.researchgate.net/profile/Murugan_Mahalingam/publication/251920681_Microwave_reflectivity_measurement_of_silicon_urea_polyvinyl_alcohol_epoxy_resin_composites_in_X_and_Ku_bands/links/56150a2908aec62244117b52/Microwave-reflectivity-measurement-of-silicon-urea-polyvinyl-alcohol-epoxy-resin-composites-in-X-and-Ku-bands.pdf.

Messer, A'ndrea Elyse. "Jet Contrails Affect Surface Temperatures." *Penn State News*, Penn State University, 18 Jun. 2015, news.psu.edu/story/361041/2015/06/18/research/jet-contrails-affect-surface-temperatures.

"Nitrous Oxide." *Wikipedia*, Wikimedia Foundation, 15 Jan. 2019, en.wikipedia.org/wiki/Nitrous_oxide.

Notman, Nina. "Haber-Bosch Power Consumption Slashed." *Chemistry World*, 21 Oct. 2012, www.chemistryworld.com/news/haber-bosch-power-consumption-slashed/5544.article.

Schifman, Jonathan. "The Entire History of Steel." *Popular Mechanics*, Popular Mechanics, 20 Dec. 2018, www.popularmechanics.com/technology/infrastructure/a20722505/history-of-steel/.

Smith, Wake, and Gernot Wagner. "Stratospheric Aerosol Injection Tactics and Costs in the First 15 Years of Deployment." *Environmental Research Letters*, vol. 13, no. 12, 22 Nov. 2018, p. 124001.

Stubbings, Janice. *Uses and Production of Ammonia by the Haber Process.* www.ausetute.com.au/haberpro.html.

Travis, David J, et al. "Contrails Reduce Daily Temperature Range." *Archive.org*, Nature, 8 Aug. 2002, web.archive.org/web/20160411094048/http://www.atmos.washington.edu/~rennert/etc/courses/pcc587/ref/Travis-etal2002_Nature.pdf. Nature Vol. 418.

"Urea Production and Manufacturing Process." *ICIS*, 28 Apr. 2010, www.icis.com/explore/resources/news/2007/11/07/9076560/urea-production-and-manufacturing-process/.

Valera-Medina, Agustin, et al. "Ammonia-Methane Combustion in Tangential Swirl Burners for Gas Turbine Power Generation." *Elsevier/Applied Energy*, Academic Press, 24 Feb. 2016, www.sciencedirect.com/science/article/pii/S0306261916302100#f0010. Primarily section 3.

Woodford, Chris. "Jet Engines." *Explain That Stuff*, 22 Apr. 2018, www.explainthatstuff.com/jetengine.html. Primarily section titled "Types of Jet Engines"

[1] https://www.sciencedirect.com/science/article/pii/S0306261916302100#f0010
[2] https://en.wikipedia.org/wiki/Combustor
[3] https://www.explainthatstuff.com/jetengine.html
[4] https://www.greencarcongress.com/2015/11/20151109-trentxwb.html
[5] http://enggyd.blogspot.com/2010/09/flow-diagram-of-urea-production-process.html
[6] http://2.bp.blogspot.com/jwzEb3tcs7U/TI9ZmT-3tLI/AAAAAAAAAIc/8j84kywCyls/s1600/urea.png
[7] http://iopscience.iop.org/article/10.1088/1748-9326/aae98d
[8] https://globalnews.ca/news/2934513/empty-skies-after-911-set-the-stage-for-an-unlikely-climate-change-experiment/experiment/

[9]https://web.archive.org/web/20160411094048/http://www.atmos.washington.edu/~rennert/etc/courses/pcc587/ref/Travis-etal2002 Nature.pdf

[10]Ibid.

[11]https://news.psu.edu/story/361041/2015/06/18/research/jet-contrails-affect-surface-temperatures

[12] https://en.wikipedia.org/wiki/Aviation fuel

[13]Ibid.

[14] https://www.atsdr.cdc.gov/ToxProfiles/tp76-c3.pdf

[15]https://en.wikipedia.org/wiki/2-Methylhexane

[16]https://cs.stanford.edu/people/eroberts/courses/ww2/projects/jet-airplanes/how.html

[17] https://en.wikipedia.org/wiki/Haber process
[18] Ibid.
[19] https://en.wikipedia.org/wiki/Combustor
[20] https://en.wikipedia.org/wiki/Haber process

[21]https://www.chemistryworld.com/news/haber-bosch-power-consumption-slashed/5544.article

[22]http://www.ausetute.com.au/haberpro.html

[23]https://www.sciencedirect.com/science/article/pii/S0306261916302100#f0010

[24] https://en.wikipedia.org/wiki/Nitrous oxide

[25]https://www.icis.com/explore/resources/news/2007/11/07/9076560/urea-production-and-manufacturing-process/

[26]https://eurekamag.com/pdf/002/002492859.pdf

[27]Ibid.

[28]https://en.wikipedia.org/wiki/Urea

[29]https://www.researchgate.net/profile/Murugan_Mahalingam/publication/251920681_Microwave_reflectivity_measurement_of_silicon_urea_polyvinyl_alcohol_epoxy_resin_composites_in_X_and_Ku_bands/links/56150a2908aec62244117b52/Microwave-reflectivity-measurement-of-silicon-urea-polyvinyl-alcohol-epoxy-resin-composites-in-X-and-Ku-bands.pdf

[30]Ibid.

[31]http://courses.washington.edu/phys432/NH3/ammonia_inversion.pdf

[32]Ibid.

[33]https://www.popularmechanics.com/technology/infrastructure/a20722505/history-of-steel/

[34]Ibid.

[35]https://www.agmrc.org/renewable-energy/renewable-energy/ammonia-as-a-transportation-fuel Having described my invention herein, I claim:

1. An aircraft engine modification consisting of a ring of structures containing Haber Processes surrounding and lying longitudinally along the high pressure and high temperature area of an aircraft engine consisting of two cooperating pathways:

Pathway A (particulate dispersion), wherein a) an initial Haber Process would lead to b) a higher temperature, higher pressure, higher efficiency Haber Process sitting above it with 0 c) both Haber processes leading to, d) an ammonia bypass chamber, e) a Urea production chamber (CO2+NH3), f) a Urea distillation chamber and flash drum and/or vacuum evaporator and g) a miniature Prilling tower where various sections could be combined or repurposed for the different steps in the Urea production process, and where the entire pathway would produce a mixture of Ammonia and Urea which can be ejected into the aircraft engine contrail, and Pathway B (thrust) which would be identical to Pathway A except instead of structures dedicated to Urea production there would be h) an ammonia combustion chamber, i) a nitrous oxide creation chamber which could either be ported directly into j) the main combustion area of the engine via nozzles or k) into a secondary (Jet A, ammonia/methane mix, or other fuels) combustion chamber which produces thrust.

* * * * *